(12) United States Patent
Colton et al.

(10) Patent No.: US 6,509,841 B1
(45) Date of Patent: Jan. 21, 2003

(54) SYSTEM AND METHOD FOR COMMUNICATION BETWEEN REMOTE LOCATIONS

(75) Inventors: Laurence Jay Colton, Lafayette Hill, PA (US); Douglas D. Faith, Schwenksville, PA (US); Richard David Rioboli, Wayne, PA (US); Jonathan Peter Worman, Chandler, AZ (US)

(73) Assignee: CIC Global, LLC, TN (US)

( * ) Notice: Subject to any disclaimer, the term of this patent is extended or adjusted under 35 U.S.C. 154(b) by 96 days.

(21) Appl. No.: 09/703,298

(22) Filed: Nov. 1, 2000

Related U.S. Application Data

(63) Continuation of application No. 09/303,173, filed on Apr. 30, 1999, which is a continuation of application No. 08/949,440, filed on Oct. 16, 1997, now Pat. No. 5,986,574.

(51) Int. Cl.[7] .............................................. G08C 19/04
(52) U.S. Cl. ............................ 340/870.11; 340/870.2; 370/320
(58) Field of Search ........................ 340/870.02, 870.11, 340/870.13; 370/320; 375/211

(56) References Cited

U.S. PATENT DOCUMENTS

| | | |
|---|---|---|
| 3,445,814 A | 5/1969 | Spalti |
| 3,656,112 A | 4/1972 | Paull |
| 3,683,343 A | 8/1972 | Feldman, et al. |
| 3,688,271 A | 8/1972 | Rouse |
| 3,693,155 A | 9/1972 | Crafton et al. |
| 3,702,460 A | 11/1972 | Blose |
| 3,705,385 A | 12/1972 | Batz |
| 3,706,930 A | 12/1972 | Harner |
| 3,719,928 A | 3/1973 | Oishi et al. |
| 3,747,104 A | 7/1973 | Pansini |
| 3,815,119 A | 6/1974 | Finlay, Jr. et al. |
| 3,820,106 A | 6/1974 | Yamashita et al. |
| 3,855,503 A | 12/1974 | Ristuccia |
| 3,900,842 A | 8/1975 | Calabro et al. |
| 3,911,415 A | 10/1975 | Whyte |
| 3,914,757 A | 10/1975 | Finlay, Jr. et al. |
| 3,925,763 A | 12/1975 | Wadhwani et al. |
| 3,942,168 A | 3/1976 | Whyte |
| 3,942,170 A | 3/1976 | Whyte |
| 3,944,723 A | 3/1976 | Fong |
| 3,944,932 A | 3/1976 | Fong |
| 3,952,285 A | 4/1976 | Falck, Jr. |
| 3,967,264 A | 6/1976 | Whyte et al. |
| 3,973,240 A | 8/1976 | Fong |
| 3,980,954 A | 9/1976 | Whyte |
| 4,040,046 A | 8/1977 | Long et al. |
| 4,085,287 A | 4/1978 | Kullman et al. |
| 4,101,834 A | 7/1978 | Stutt et al. |

(List continued on next page.)

FOREIGN PATENT DOCUMENTS

| | | |
|---|---|---|
| EP | 629098 | 12/1994 |
| GB | 1140251 | 2/1965 |
| GB | 1121719 | 8/1966 |
| GB | 1172344 | 11/1969 |
| GB | 1400477 | 7/1975 |

*Primary Examiner*—Timothy Edwards, Jr.
(74) *Attorney, Agent, or Firm*—Schnader Harrison Segal & Lewis LLP

(57) ABSTRACT

A communication system transmits data between a plurality of locations. The communication system is suitable for use by a utility provider to monitor a plurality of metering devices from a remote location. The communication system in accordance with use by a utility provider to monitor metering devices comprises a control for at least receiving data, a plurality of metering devices arranged in a defined number of metering groups for transmitting data associated with an amount of usage of a utility, and a defined number of concentrators, each operably connected to the control and one metering group for transmission of data between the control and plurality of metering devices.

13 Claims, 3 Drawing Sheets

U.S. PATENT DOCUMENTS

| | | |
|---|---|---|
| 4,107,656 A | 8/1978 | Farnsworth et al. |
| 4,109,204 A | 8/1978 | Kincaid et al. |
| 4,130,874 A | 12/1978 | Pai |
| 4,131,881 A | 12/1978 | Robinson |
| 4,135,101 A | 1/1979 | Young et al. |
| 4,135,181 A | 1/1979 | Bogacki et al. |
| 4,161,720 A | 7/1979 | Bogacki |
| 4,178,482 A | 12/1979 | Ouellette |
| 4,188,619 A | 2/1980 | Perkins |
| 4,190,800 A | 2/1980 | Kelly, Jr. et al. |
| 4,199,761 A | 4/1980 | Whyte et al. |
| 4,204,194 A | 5/1980 | Bogacki |
| 4,204,195 A | 5/1980 | Bogacki |
| 4,250,489 A | 2/1981 | Dudash et al. |
| 4,254,402 A | 3/1981 | Perkins |
| 4,264,960 A | 4/1981 | Gurr |
| 4,270,206 A | 5/1981 | Hughes |
| 4,276,644 A | 6/1981 | De Witte |
| 4,298,986 A | 11/1981 | Hughes |
| 4,300,126 A | 11/1981 | Gajjar |
| 4,301,445 A | 11/1981 | Robinson |
| 4,302,750 A | 11/1981 | Wadhwani et al. |
| 4,307,464 A | 12/1981 | Hughes |
| 4,308,619 A | 12/1981 | Hughes |
| 4,310,805 A | 1/1982 | Hackert et al. |
| 4,315,251 A | 2/1982 | Robinson et al. |
| 4,322,842 A | 3/1982 | Martinez |
| 4,323,882 A | 4/1982 | Gajjar |
| 4,344,180 A | 8/1982 | Cummiskey |
| 4,349,879 A | 9/1982 | Peddie et al. |
| 4,361,766 A | 11/1982 | deMontgolfier et al. |
| 4,375,100 A | 2/1983 | Tsuji et al. |
| 4,393,501 A | 7/1983 | Kellogg et al. |
| 4,396,915 A | 8/1983 | Farnsworth et al. |
| 4,400,811 A | 8/1983 | Brown et al. |
| 4,427,968 A | 1/1984 | York |
| 4,429,299 A | 1/1984 | Kabat et al. |
| 4,446,462 A | 5/1984 | Ouellette et al. |
| 4,455,655 A | 6/1984 | Galen et al. |
| 4,462,109 A | 7/1984 | Hughes |
| 4,475,217 A | 10/1984 | Hughes |
| 4,504,831 A | 3/1985 | Jahr et al. |
| 4,513,415 A | 4/1985 | Martinez |
| 4,517,562 A | 5/1985 | Martinez |
| 4,518,822 A | 5/1985 | Martinez |
| 4,584,685 A | 4/1986 | Gajjar |
| 4,628,313 A | 12/1986 | Gombrich et al. |
| 4,641,322 A | 2/1987 | Hasegawa |
| 4,641,325 A | 2/1987 | Hughes |
| 4,713,837 A * | 12/1987 | Gordon ....................... 379/93 |
| 4,749,992 A | 6/1988 | Fitzemeyer et al. |
| 4,833,618 A | 5/1989 | Verma et al. |
| 4,862,493 A | 8/1989 | Venkatarman et al. |
| 4,881,070 A | 11/1989 | Burrowes et al. |
| 5,268,666 A | 12/1993 | Michel et al. |
| 5,438,329 A | 8/1995 | Gastouniotis et al. .. 340/870.02 |
| 5,452,291 A | 9/1995 | Eisenhandler et al. |
| 5,495,239 A | 2/1996 | Ouellette |
| 5,553,094 A | 9/1996 | Johnson et al. ........ 340/870.06 |
| 5,590,179 A | 12/1996 | Shincovich et al. |
| 5,602,744 A | 2/1997 | Meek et al. |
| 5,699,276 A | 12/1997 | Roos |
| 5,748,104 A | 5/1998 | Argyroudis et al. |
| 5,801,643 A * | 9/1998 | Williams et al. ....... 340/870.02 |
| 6,300,881 B1 | 10/2001 | Yee et al. .............. 340/870.02 |

* cited by examiner

SYSTEM AND METHOD FOR COMMUNICATION BETWEEN REMOTE LOCATIONS

CROSS-REFERENCE TO RELATED APPLICATIONS

This is a continuation of U.S. patent application Ser. No. 09/303,173 filed Apr. 30, 1999, which is a continuation of U.S. patent application Ser. No. 08/949,440 filed Oct. 16, 1997, now U.S. Pat. No. 5,986,574.

BACKGROUND OF THE INVENTION

1. Field of the Invention

The present invention relates generally to utility monitoring systems and more particularly to systems for communicating between remote locations.

2. Description of the Prior Art

Metering devices have for years been used in the monitoring of utility consumption, such as water, electricity, gas, to name a few. Utility providers have typically utilized metering devices at the various locations of its customers, i.e., residences or businesses, in order to monitor the consumption of a given utility. The utility provider would monitor the utility consumption by reading the various metering devices at each of the customer locations. In recent years, it has been recognized that the costs incurred by the utility provider have significantly increased in view of the numerous employees required to manually read each of the metering devices at the customer locations; especially in view of the higher number of customers of many current day utility providers.

In view of the foregoing, there is seen a need to provide a system for monitoring of metering devices from remote locations in order to reduce both the time and costs associated with manual reading of metering devices.

SUMMARY OF THE INVENTION

The present invention discloses a system and method for a utility provider to monitor a plurality of metering devices from a remote location. For this purpose, the present invention discloses control means for at least receiving data, a plurality of metering devices arranged in a defined number of metering groups and a defined number of concentrators, with each concentrator comprising relay means for communication between one metering group and the control means.

The present invention also discloses a relay for communication between a plurality of metering devices and at least one control station. As will be described in more detail herein, the relay in one embodiment comprises LAN means for receiving data from the plurality of metering devices over a local area network and WAN means for transmitting data associating with the plurality of metering devices over a wide area network to the at least one control station.

The present invention also discloses a communication system for transmitting data between a plurality of locations. In this regard, the present invention comprises control means for receiving and transmitting data, relay means in communication with the control means and a plurality of servicing means in communication with the relay means for transmitting data to and receiving data from the control means.

In accordance with the present invention, an object is to provide a system and method for a utility provider to monitor metering devices from remote locations.

Another object of the present invention is to provide a system and method for monitoring metering devices from remote locations which is efficient in operation so that minimal parts are required and which can be provided at minimal cost.

Still another object of the present invention is to provide a communication system for transmitting data between a plurality of locations.

Another object of the present invention is to provide a novel concentrator for use in data transmission between a plurality of locations to provide for improved data transmission.

These and other objects of the present invention will become more readily apparent when taken into consideration with the following description and the attached drawings.

DETAILED DESCRIPTION OF THE PREFERRED EMBODIMENTS

Figure 1:
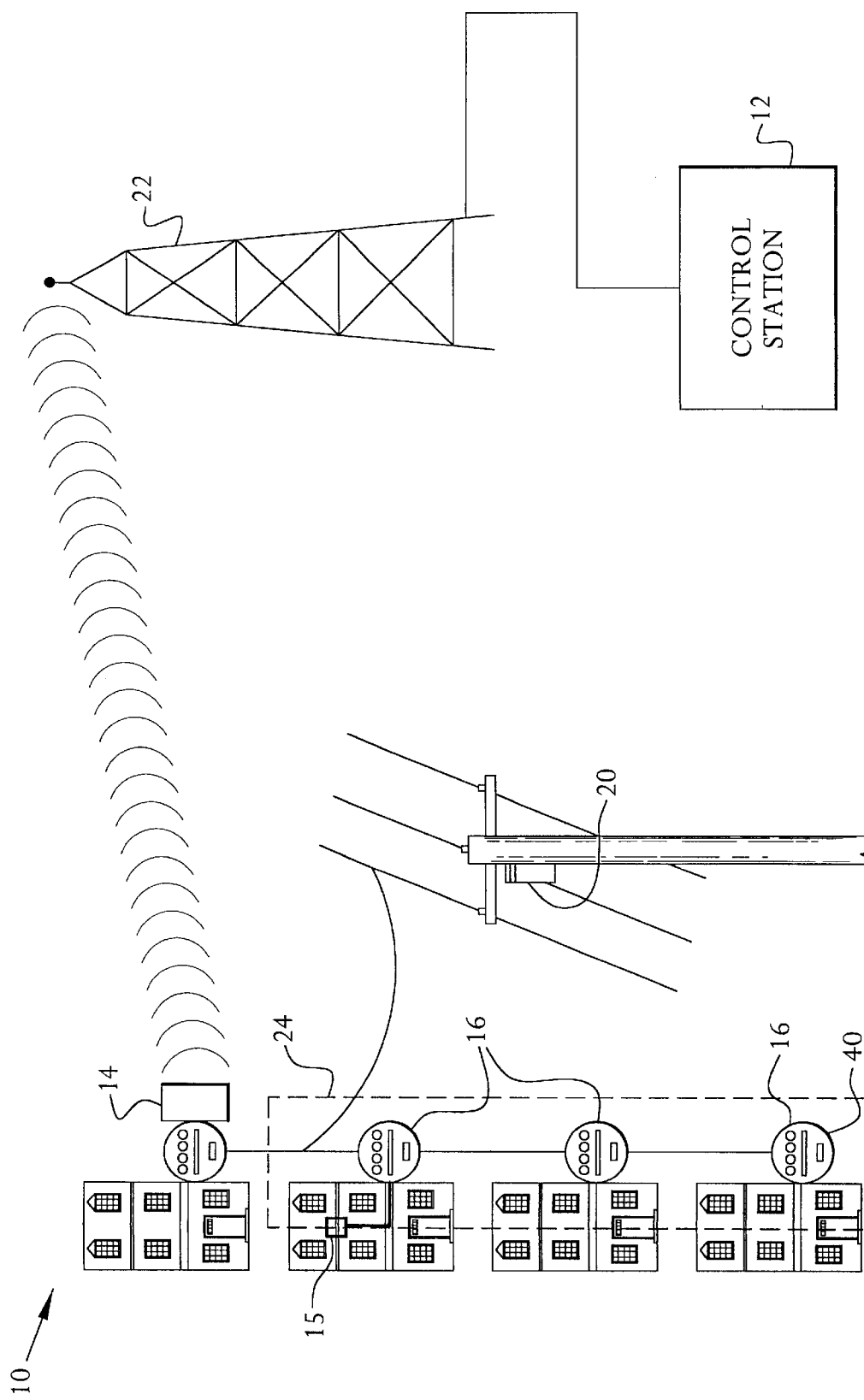
FIG. 1 is a partly schematic and partly block diagram of an embodiment of a communication system in accordance with the present invention.

Referring now to the drawings in detail, wherein like reference numerals indicate the like elements throughout the several views, there is shown in FIG. 1 a partly schematic and partly block diagram of a communication system in accordance with an embodiment of the present invention. The communication system 10 as is shown in FIG. 1 comprises, as portions thereof, control means 12, a defined number of relay means 14 in communication with the control means 12 and at least one and preferably a plurality of servicing means 16 in communication with the relay means 14, the details of which will be more fully set forth hereinafter.

In accordance with the present embodiment, the communication system 10 is adapted for use by a utility provider for customer communication. As should be understood, however, the communication system 10 in accordance with the present invention has broader application and can be used for any desired application. The control means or station 12 preferably is located at a desired location and is capable for transmitting and receiving data in the form of signals, for example, a computer, microprocessor or similar device, i.e., a Pentium® based PC can be employed. In the present embodiment, the control means 12 is located at the site of the utility provider, although any other desired location can also be utilized for this purpose. Although not shown, the control means 12 can be provided in communication with other devices as well, such as one or more personal computers or computer terminals, for example, for display, for data input or processing or other desired functions. In accordance with the present invention, the data signals transmitted over the communication system 10 between the control means 12, relay means 14 and servicing means 16 can be carried by any desired medium, such as either by any wireless medium, such as radio frequency (RF) or infrared (IR) signals, or can be carried over any wire medium, such as 110 volt AC power line (PLC), twisted pair (TP) cable, fiber optic cable and coax cable. In the present embodiment, the data signals transmitted between the control means 12 and the relay means 14 preferably are carried over both wire and wireless mediums, which is described in more detail below.

As illustrated in FIG. 1, the control means 12 is in communication by a wire medium with switching means comprising at least one radio tower 22, which in turn is in communication with the relay means 14 via a suitable wireless medium. In a preferred embodiment, the control means 12 and relay means 14 are in communication with the radio tower 22 via a publicly available Wide Area Network (WAN), for example, such as Sprint PCS, AT&T Wireless, and Verizon Wireless. In this manner, the signals received by the WAN provider over wire signals from the control means 12 are transmitted as suitable wireless signals, preferably RF signals, from the radio tower 22 to the relay means 14. Similarly, in the presently preferred embodiment, the wireless signals received by the WAN provider from the relay means 14 are transmitted over wire to the control means 12.

The relay means 14 in the present embodiment shown in FIG. 1 is preferably in communication over a suitable wire medium with the servicing means 16, although as should be understood a suitable wireless medium can also be used. In accordance with the present invention, there are a defined number of relay means 14, with each relay means 14 being in communication with a selected number of servicing means 16 comprising a servicing group 24. As illustrated in FIG. 1, in the present embodiment, there is shown the servicing group 24 comprising three servicing means 16 in communication with the one relay means 14. In a presently preferred embodiment, the servicing group 24 is in communication with the relay means 14 via a Local Area Network (LAN). More preferably, communication between the servicing group 24 and the relay means 14 is accomplished using a Consumer Electronics Bus (CEBus) standard, which is described in more detail below, although as should be understood, other suitable protocols can also be used for this purpose. Also, preferably communication between the relay means 14 and the control means 12 is accomplished using a suitable WAN protocol.

The CEBus standard is a home automation standard developed by the Electronics Industry Association and the Consumer Electronics Manufacturers Association to provide economical LAN communications among consumer products within the home. The CEBus standard is explained in greater detail in Electronics Industries Association/IS-60, "Home Automation Standard" (CEBus) December 1989, which is incorporated herein by reference. The CEBus protocol was designed to cover communications between various types of products over any of a number of accepted media that support CEBus, which includes PLC, TP cable, coaxial cable, IR, RF and fiber optic cable.

Figure 3:
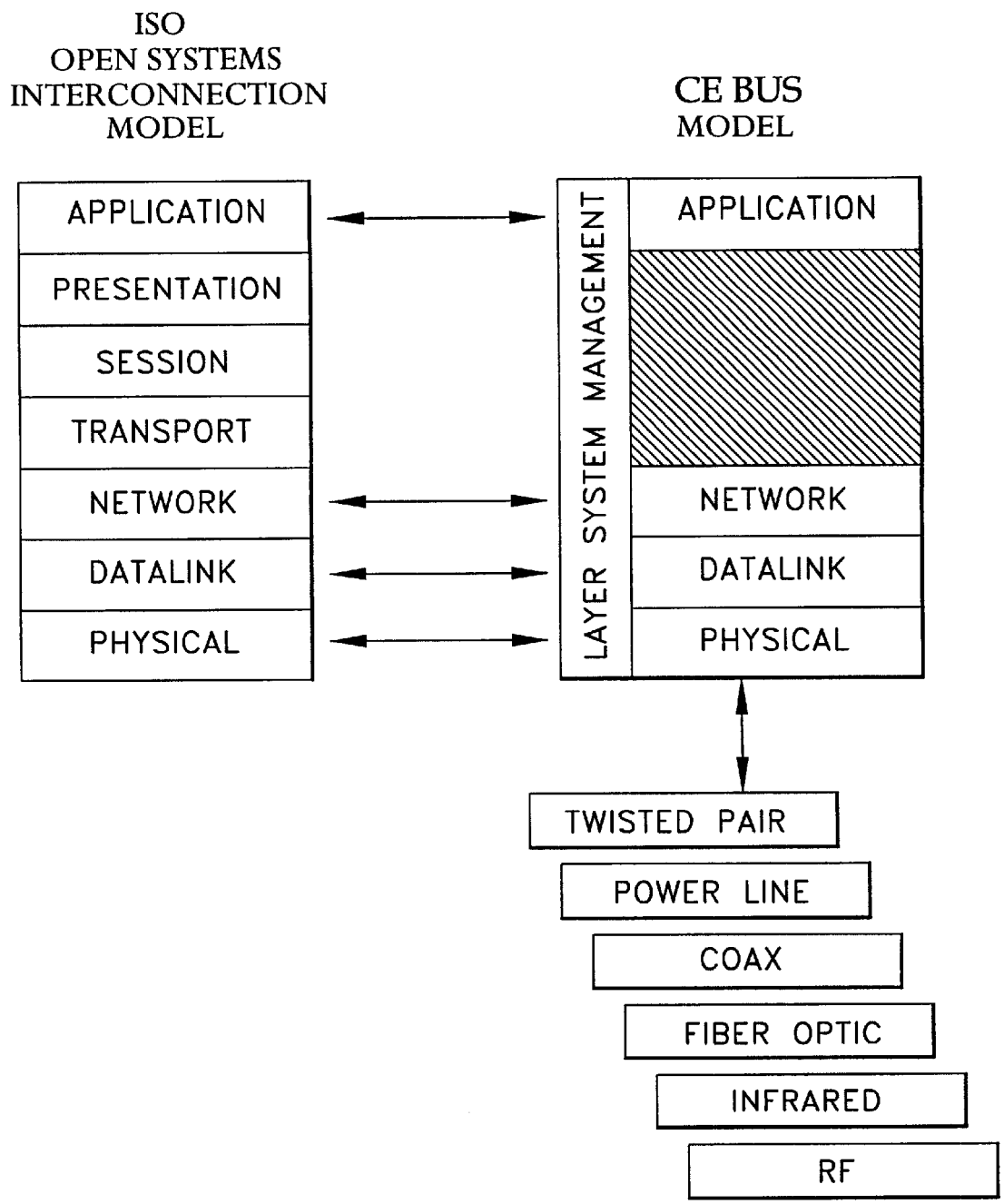
FIG. 3 is a block diagram illustrating protocol layering associated with a Consumer Electronics Bus Standard.

As illustrated in FIG. 3, the CEBus standard is a four layer model based on the International Standards Organization's (ISO) Open Systems Interconnection seven layer model for communication. The four layers utilized in the CEBus protocol include application, network, data link and physical layers, which are defined in the following paragraph.

The physical layer is the form of signal and provides the characteristics to activate, maintain and deactivate the physical links passing the stream of communication symbols. The physical layer exchanges symbols with the data link layer, encoding and decoding the symbols to and from the medium states. The states required to represent the symbols are modulated and demodulated with the medium carrier by the physical layer. The data link layer provides the means for establishing and maintaining individual data links, provides for the transfer of information over the physical link with the required synchronization, error control and flow control functions, provides for the encapsulation and de-encapsulation of the messages exchanged between itself and the network layer, and exchanges symbols and medium status between itself and the physical layer. The network layer sets basic standards for formatting of information once the link is established and provides the switching and routing functions needed to establish, maintain and terminate connections and data transfer. The application layer specifies how service is received or experienced and is responsible for managing the communication access.

In accordance with the present invention, preferably each of the servicing means 16 comprises means for transmitting and receiving data for communication with the control means 12 via the relay means 14; for example, conventional transmitter and receiver units can be utilized for this purpose. In a presently preferred embodiment illustrated in FIG. 1, each of the servicing means 16 comprises a metering device and located at the site of the customer of the utility provider, i.e., residencies or businesses. For example, each of the metering devices 16 can comprise a typical rotary, electro-mechanical or electronic type utility meter, although other suitable types of metering devices would also be applicable. In addition, each metering device 16 preferably includes means for measuring an amount of usage of a utility, such as electricity, gas or water, as examples, for the specific location to which the metering device 16 is connected. In the regard, the metering devices 16 preferably are of the incremental type similar to typical metering devices. In addition, the metering devices 16 also preferably include means for processing and storing of the data associated with the measured amount of utility usage, for example, a microprocessor with suitable storage means, such as random access memory (RAM) and read only memory (ROM). As should be understood, in other embodiments where the servicing means 16 are not in the form of metering devices, the foregoing features associated with monitoring of a given utility would not be required.

In accordance with the present embodiment, the metering devices 16 are each connected via power lines to the relay means 14, either by a direct connection between each metering device 16 to the relay means 14 or, as shown in FIG. 1, with each of the metering devices 16 being connected via power lines in a series and one of the metering devices 16 then being connected to the relay means 14. In other embodiments, the metering devices 16 can be connected by other wire mediums and/or wireless mediums to the relay means 14 as well, for example, a wireless medium may be suited where the metering devices are used for measuring gas, in view of typical gas metering devices which do not require connection to a power source, whereas a wire medium may be more suited for embodiments in which the metering devices are for measuring electricity, as most typical metering devices used for measuring electricity usage are connected to a 240 volt power outlet, thus easily adapted for power line communication. As should be understood, the foregoing examples are for illustration purposes only and are not intended to limit the scope of the present invention. In the present embodiment, preferably the communication system 10 also includes at least one and typically a plurality of distribution transformers 20, positioned between one or more metering devices 16 and the relay means 14, for scaling downward to 220 volts the typically higher voltages generated over the power lines. In this manner, a LAN is established between each of the metering devices 16 and the relay means 14.

Figure 2:
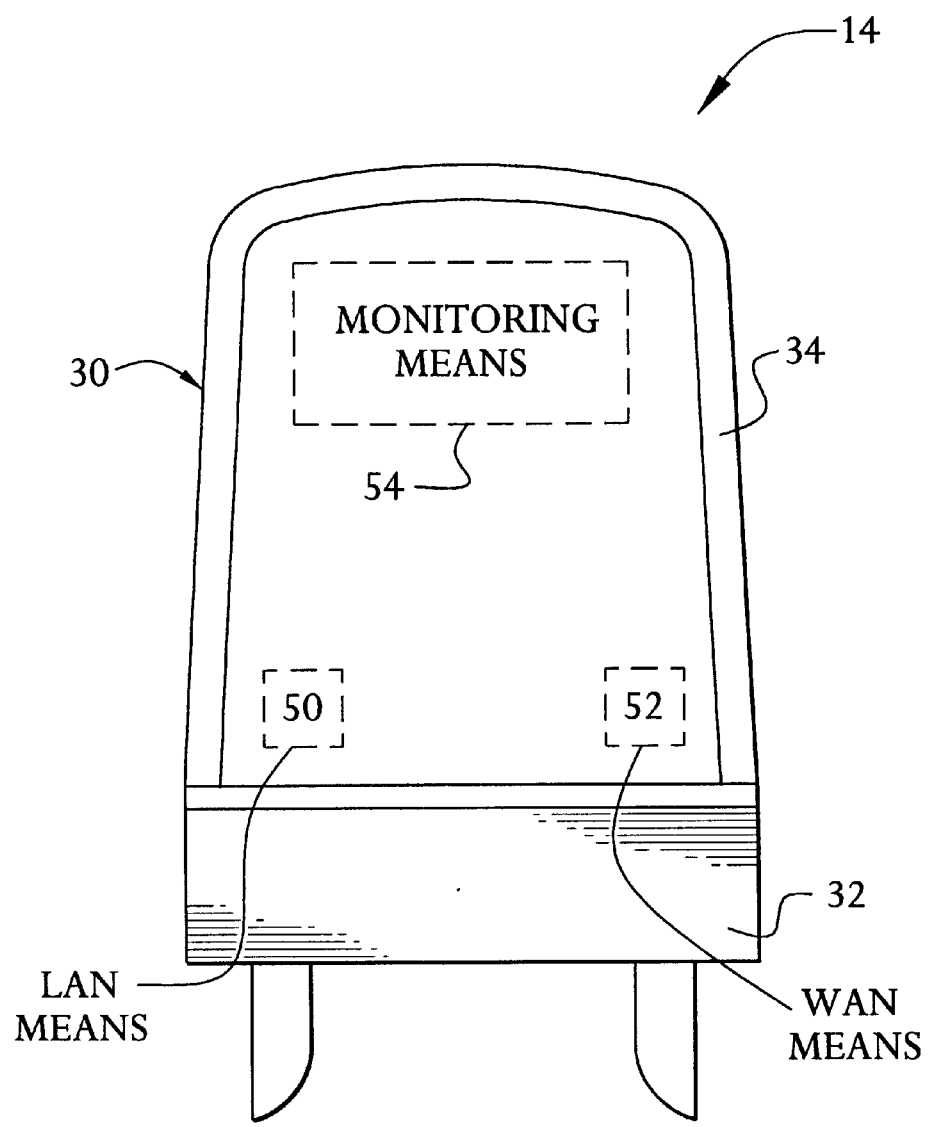
FIG. 2 is a partly schematic and partly block diagram of an embodiment of a concentrator of FIG. 1.

In accordance with the present invention, the relay means 14 can be positioned at any desired location within the communication system 10; for example, the relay means 14 can be located on a distribution pole or other location. In the present embodiment, preferably the relay means 14 comprises a concentrator in the form of a meter and positioned at the location of a customer. The concentrator meter 14 in accordance with an embodiment of the present invention is illustrated in detail in the block diagram of FIG. 2. The concentrator meter 14 preferably includes LAN means 50 for receiving and transmitting data over the local area network, such as a conventional transmitter and receiver. In addition, in the present embodiment, the concentrator meter 14 also preferably includes WAN means 52 for communicating (receiving and transmitting) data over the wide area network with the control means 12 via the switching means 22, such as a conventional WAN radio; for example, the Code Division Multiple Access type, commercially available from Qualcomm, the Time Division Multiple Access type, commercially available from Ericsson, and the Cellular Digital Packet Data type, commercially available from Sierra Wireless and Novatel. In one embodiment, the concentrator meter 14 includes a CDMA communication link illustrated by LAN means 50 and WAN means 52 for receiving and transmitting data between the metering devices 16 and control means 12. In addition, similar to the metering devices 16, preferably the concentrator meter 14 includes monitoring means 54 for measuring an amount of usage of a utility at a given location, similar to conventional incremental type metering devices including those of the rotary, electro-mechanical and electronic types. The concentrator meter 14 in the present embodiment also preferably includes means for processing and storing data associated with both the amount of utility usage measured by the concentrator meter 16 as well as received from the metering devices 16, for example, a conventional microprocessor and storage means, such as suitable amounts of RAM and ROM. In the present embodiment, the concentrator meter 14 further preferably includes means for exchanging between two media, for example between radio frequency signals and signals transmitted over the power lines in the present embodiment, such as a conventional router device. The concentrator meter 14 can also include a battery for providing a backup power source. In the present preferred embodiment, the concentrator meter 14 preferably also includes a housing into which each of the foregoing elements are disposed and retained as a unit. For example, as shown in FIG. 3, the housing 30 is generally elongated and substantially cylindrical in cross section having an inner cavity into which the components of the concentrator meter 14 are mounted, such as the LAN means 50, WAN means 52 and monitoring means 54 as illustrated. In the present embodiment, the housing 30 comprises a base 32 to which the elements of the concentrator meter are attached and a cover 34, preferably clear, such as of glass or plastic, and having a cavity receiving the elements of the concentrator meter 14 and attached to the base 32, although as should be understood, the housing 30 can be of other configurations as well. Similar to the servicing means 16 described above, the relay means 14 in other embodiments may be utilized for communication between the control means 12 and servicing means 16 without also providing the function of a meter, and accordingly the foregoing elements directed to providing the function of the meter can be eliminated where desired.

The operation of the communication system 10 in accordance with the present embodiment will now be described. As described earlier, one advantage of the communication system 10 in accordance with the present embodiment is that the utility provider can monitor the utility usage of a customer from a remote location. For this purpose, a command can be generated automatically from the control means 12, such as by a software program, or manually from a technician or other personnel to instruct a given metering device at a particular customer location to transmit the measured amount of utility usage. Alternately, the metering devices 16 can be preprogrammed to automatically transmit the utility usage data to the control means 12 at specified intervals. For purposes of this illustration, a signal is initially generated by the control means 12 to a particular metering device 16. In accordance with the CEBus protocol, the signal generated from the control means 12 is preferably generated in packets of data in digital form and incorporates within the packet an identifier, such as a number, associated with the particular metering device or devices which monitoring is desired. The data signal is transmitted from the control means 12 over the wire medium, such as telephone lines, which are received by the WAN provider for re-transmission to the concentrator meter 14. The WAN provider exchanges the data from the wire to wireless medium, such as by a router, and then transmits the data as radio frequency signals to the concentrator meter 14. The concentrator meter 14, in turn, exchanges the data received over the wide area network for transmission via power line communication over the local area network to the metering devices 16. In the present embodiment, the concentrator meter 14 can be pre-programmed so as to transmit a data signal only to a particular metering device or devices 16 depending on the particular meter identified in the packet of data. Alternatively, the concentrator meter 14 can be programmed to transmit the data signals to each of the metering devices 16, with the metering devices 16 in turn programmed to respond only when its particular meter identifier is detected. For purposes of this illustration, it will be assumed that the concentrator meter 14 is constructed so as to transmit data to each of the metering devices 16, with the data generated from the control means 12 including an identifier for a particular metering device 16 designated as number "1" to monitor utility usage. Further, preferably the control means 12 correlates the metering device 16 designated as number "1" with the appropriate concentrator meter 14. In this example, the meter device 16 designated as number "1" is illustrated in FIG. 1 by the metering device 40. The metering device 40 receives the data signal from the concentrator meter 14 and in response transmits data in signal form incorporating a reading of the amount of utility usage measured at the particular customer location. In a similar manner to that described above, the signal from the metering device 40 is passed through the concentrator meter 14 and is received via the WAN provider by the control means 12. In this manner, a read of the metering devices 16 at each of the customer locations can be obtained by the utility provider.

Another advantage of the present invention is its application for transmission of data between a plurality of locations. For example, in the communication system 10 described above, communication is established between the utility provider, via the control means 12, and the customers of the utility provider, via the servicing means 16 which are in the form of metering devices, for monitoring the amount of usage of a given utility. As should be understood, the communication system of the present invention is not limited to use by a utility provider to monitor utility usage of its customers, rather the communication system of the present invention is applicable for any communication between two locations. For example, in connection with use by a utility provider, the control system 10 described above can also be adapted so that the utility provider can communicate with one or more customers, via the metering devices 16, to perform, in addition to automatic meter reads on any desired basis, other functions as well, such as outage/restoral monitoring, customer consumption readings on request, Time-Of-Use (TOU) reporting to customers, billing capability, tamper detections/deterrence and deferment of peak use through TOU rate information. In addition, through in-home user-interfaces, such as in-home terminals, smart phones, smart thermostats, etc. illustrated at 15 in FIG. 1, a utility provider in addition to reading of meters, or other entities that do not incorporate the feature of meter reading within the servicing means 16, can communicate with customers for Real Time Pricing (RTP), remote service connect/disconnect, messaging services, such as headline/local news, financial quotes, energy information, etc., and home monitoring, such as break-in and personal security, appliances, etc.

Still another advantage of the present invention is provided by the relay means 14 for communication between the control means 12 and servicing means 16, which provides for efficient operation in that only one relay means 14 is required for a plurality of servicing means 16. In addition, the relay means 14 when in the form of the concentrator meter 14 provides for even greater efficiency since the features of a meter and relay means between the metering devices 16 and control means 12 are combined into a single unit and which can be provided directly at a customer location.

It will be recognized by those skilled in the art that changes may be made by the above-described embodiments of the invention without departing from the broad inventive concepts thereof. It is understood, therefore, that this invention is not limited to the particular embodiments disclosed, but it is intended to cover all modifications which are within the scope and spirit of the invention as defined by the appended claims.

We claim:

1. A remote two-way communication system comprising:
   a relay having a code-division multiple access (CDMA) communication link for carrying data;
   at least one servicing device for measuring a local parameter, and for transmitting data over said CDMA communication link to said relay in response to said measurement, and for receiving data over said CDMA communication link from said relay; and
   a control device for receiving over said CDMA communication link from said relay data transmitted by said at least one servicing device corresponding to said measurement of said local parameter, said control device further for transmitting over said CDMA communication link to said relay data received by said at least one servicing device including instructions for said at least one servicing device to measure said local parameter, whereby data is transmitted in two directions between said at least one servicing device and said control device by being passed through said relay.

2. A system of claim 1 further comprising a user interface for communicating information corresponding to said local parameter and said data transmitted by said control device to said at least one servicing device.

3. A system of claim 2 wherein said user interface is in communication with said control device, said user interface being regulated in response to said data from said control device.

4. A system of claim 3 wherein said user interface further communicates information corresponding to regulation of said user interface.

5. A system of claim 1, wherein said first servicing device comprises a metering device and with said metering device comprising means for measuring local usage and for transmitting said data corresponding to said measured local usage.

6. A system of claim 5, wherein said at least one servicing device comprises a plurality of metering devices, with said plurality of metering devices each comprising means for measuring local usage and with said plurality of metering devices transmitting a plurality of data associated with said measured local usage in response to a plurality of data from said control device.

7. A system of claim 6, wherein said plurality of metering devices are arranged in a defined number of metering groups, with each said metering group comprising a selected number of said plurality of metering devices, and wherein said system further comprises a defined number of relays, with each relay being in communication with said control device and one metering group.

8. A system for remote two-way meter reading comprising:
   a metering device comprising means for measuring usage and for transmitting data associated with said measured usage in response to receiving a read command;
   a control for transmitting said read command to said metering device and for receiving said data associated with said measured usage transmitted from said metering device; and
   a relay for code-division multiple access (CDMA) communication between said metering device and said control, wherein said data associated with said measured usage and said read command is relayed between said control and metering device by being passed through said relay.

9. The system of claim 8 further comprising:
   a plurality of metering devices, with each said plurality of metering devices comprising means for measuring usage and for transmitting data associated with said measured usage in response to receiving a read command, wherein said plurality of metering devices are arranged in a defined number of metering groups, with each said metering group comprising a selected number of said plurality of metering devices; and
   a defined number of relays, with each relay being in communication with said control and one metering group.

10. The system of claim 9 further comprising a user interface for communicating information corresponding to said measured usage.

11. The system of claim 10 further comprising a remote device in communication with said control, said remote device being regulated in response to a control message from said control.

12. The system of claim 11, wherein said user interface communicates information corresponding to regulation of said remote device.

13. The system of claim 12, wherein said remote device is in communication with control means by said metering device.

* * * * *